United States Patent
Kawamura et al.

(10) Patent No.: US 8,320,466 B2
(45) Date of Patent: Nov. 27, 2012

(54) MIXED VIDEO DELIVERING APPARATUS AND METHOD, AND COMPUTER STORAGE MEDIUM

(75) Inventors: Takuya Kawamura, Kawasaki (JP); Naohisa Shibuya, Yokohama (JP); Nobuhiko Sugasawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1053 days.

(21) Appl. No.: 12/233,932

(22) Filed: Sep. 19, 2008

(65) Prior Publication Data

US 2009/0116563 A1    May 7, 2009

(30) Foreign Application Priority Data

Nov. 1, 2007    (JP) .................................. 2007-285170

(51) Int. Cl.
*H04N 11/02*    (2006.01)

(52) U.S. Cl. ................................. 375/240.26

(58) Field of Classification Search ............. 375/240.26; 348/14.08–14.1
See application file for complete search history.

(56) References Cited

U.S. PATENT DOCUMENTS

| | | | |
|---|---|---|---|
| 6,567,128 B1 * | 5/2003 | Webb et al. ................ | 348/584 |
| 6,633,339 B1 * | 10/2003 | Goto et al. ................ | 348/425.4 |
| 2004/0257433 A1 * | 12/2004 | Lia et al. ................ | 348/14.09 |
| 2005/0195899 A1 * | 9/2005 | Han ................ | 375/240.21 |
| 2006/0083302 A1 * | 4/2006 | Han et al. ................ | 375/240.08 |
| 2006/0159185 A1 * | 7/2006 | D'Antonio et al. ........... | 375/242 |
| 2006/0170763 A1 | 8/2006 | Kawamura et al. | |

FOREIGN PATENT DOCUMENTS

| | | |
|---|---|---|
| JP | 2002-351438 | 12/2002 |
| JP | 2003-111050 | 4/2003 |
| JP | 2006-201709 | 8/2006 |
| JP | 2006-222942 | 8/2006 |
| JP | 2007-81863 | 3/2007 |

* cited by examiner

*Primary Examiner* — Gilberto Barron, Jr.
*Assistant Examiner* — David Le
(74) *Attorney, Agent, or Firm* — Finnegan, Henderson, Farabow, Garrett & Dunner, L.L.P.

(57) ABSTRACT

There is provided with a mixed video delivering apparatus, including: a video receiving unit receiving first to Nth encoded video data from first to Nth terminals; a decoding unit decoding the first to Nth encoded video data; a video mixing unit mixing first to Nth decoded video data to obtain mixed video data to be transmitted to a terminal "A" out of the first to Nth terminals; an encoding parameter storage storing first to Nth encoding parameters which are used for encoding the first to Nth videos by the first to Nth terminals; an encoding parameter selecting unit selecting an encoding parameter which is used by any one of terminals other than the terminal A; an encoding unit encoding the mixed video data with a selected encoding parameter to obtain encoded mixed video data; and a video transmitting unit transmitting the encoded mixed video data to the terminal A.

8 Claims, 15 Drawing Sheets

| VIDEO DATA NUMBER | FRAME RATE [fps] |
|---|---|
| 1 | 30 |
| 2 | 20 |
| 3 | 20 |
| 4 | 10 |

PATTERN 1

LAYOUT INFORMATION FOR PATTERN 1

| INPUT VIDEO | USE FOR MIXING | REDUCTION FACTOR | ARRANGEMENT POSITION | | |
|---|---|---|---|---|---|
| | | | X COORDINATE | Y COORDINATE | LAYER |
| 1 | YES | 1/2 | 0 | 240 | 0 |
| 2 | YES | 1/2 | 320 | 240 | 1 |
| 3 | YES | 1/2 | 320 | 0 | 2 |
| 4 | YES | 1/2 | 0 | 0 | 3 |

FIG. 8

PATTERN 2

LAYOUT INFORMATION FOR PATTERN 2

| INPUT VIDEO | USE FOR MIXING | REDUCTION FACTOR | ARRANGEMENT POSITION | | |
|---|---|---|---|---|---|
| | | | X COORDINATE | Y COORDINATE | LAYER |
| 1 | YES | 1/4 | 0 | 0 | 1 |
| 2 | YES | 1/4 | 0 | 360 | 2 |
| 3 | YES | 1/4 | 480 | 360 | 3 |
| 4 | YES | 1/1 | 0 | 0 | 0 |

FIG. 10

| VIDEO DATA NUMBER | FRAME RATE [fps] | |
|---|---|---|
| | SET VALUE | MEASURED VALUE |
| 1 | 30 | 15 |
| 2 | 20 | 20 |
| 3 | 20 | 15 |
| 4 | 10 | 5 |

FIG. 14

| VIDEO DATA NUMBER | SET VALUES | | |
|---|---|---|---|
| | FRAME RATE [fps] | BIT RATE [kbps] | RESOLUTION |
| 1 | 30 | 1500 | VGA |
| 2 | 20 | 384 | QVGA |
| 3 | 20 | 768 | VGA |
| 4 | 10 | 768 | QVGA |

FIG. 15

PATTERN 3

LAYOUT INFORMATION FOR PATTERN 3

| INPUT VIDEO | USE FOR MIXING | REDUCTION FACTOR | ARRANGEMENT POSITION | | |
|---|---|---|---|---|---|
| | | | X COORDINATE | Y COORDINATE | LAYER |
| 1 | YES | 1/4 | 0 | 0 | 1 |
| 2 | YES | 1/2 | 0 | 120 | 3 |
| 3 | YES | 1/4 | 480 | 360 | 2 |
| 4 | YES | 1/1 | 0 | 0 | 0 |

FIG. 17

MIXED VIDEO DELIVERING APPARATUS AND METHOD, AND COMPUTER STORAGE MEDIUM

CROSS REFERENCE TO RELATED APPLICATIONS

This application is based upon and claims the benefit of priority from the prior Japanese Patent Applications No. 2007-285170, filed on Nov. 1, 2007; the entire contents of which are incorporated herein by reference.

BACKGROUND OF THE INVENTION

1. Field of the Invention

The present invention relates to a mixed video delivering apparatus, a mixed video delivery method, and a program storage medium for generating a mixed video for each terminal from videos transmitted from a number of terminals participating in a videoconference, for example, and delivering the mixed video to those terminals.

2. Related Art

With the development of communication technology, inexpensive broadband network infrastructures have become widely available. Communication services such as Asymmetric Digital Subscriber Line (ADSL) and Fiber To The Home (FTTH) lines have been developed, which enables a broadband networking environment to be easily built not only in businesses but in general households.

By utilizing a broadband network, communication services that involve not only audio but video, which requires a large amount of data, can be provided. One example of provision of such services is a videoconference system. A multipoint videoconference system enables communication not only between two parties but among multiple participants by connecting a number of locations via a network.

To build a multipoint videoconference system for three or more parties, two methods are available: a method in which conference terminals exchange videos with each other and a method which employs a Multipoint Control Unit or MCU. In the latter method, the MCU receives videos from conference terminals, applies processing such as scaling or clipping to the videos, for example, and combines or mixes them into one video, which is delivered to the conference terminals. Since each conference terminal has to transmit and receive videos to and from only one MCU, this method can reduce processing load involved in video transmission/reception on each conference terminal as compared to the former method.

For mixing of videos delivered by a MCU, various types of layouts (or screen splitting) are available. For instance, such layouts include a 4- or 9-part split screen and a picture-in-picture screen utilizing overlaying, and these layouts can also be changed from a conference terminal.

At present, it is a general practice to transmit videos as compressed video data when transmitting/receiving videos over a network in order to reduce the amount of data. Each conference terminal and the MCU establish a communication session prior to transmission and reception of videos, and when they utilize Session Initiate Protocol (SIP) as a protocol for the communication session, for instance, they utilize Session Description Protocol (SDP) defined by RFC2327 to exchange an encoding method and/or encoding parameters as information about compression. When the MCU establishes an independent communication session with each of conference terminals, the MCU can also suit the capability of the respective conference terminals such that it receives videos that are encoded with encoding methods and encoding parameters that are different among the conference terminals and transmits mixed videos that are encoded with encoding methods and encoding parameters that are different among the conference terminals.

By suiting the capability and the like of each conference terminal, the MCU can receive video data that are encoded or compressed with encoding parameters that vary from one conference terminal to another and transmit mixed video data that are encoded or compressed with encoding parameters that vary from one conference terminal to another.

Since encoding parameters are independently set between the MCU and each conference terminal, a mixed video generated by the MCU contains video data that are encoded with different encoding parameters. Here, consider a three-party conference and focus attention to frame rate as an encoding parameter. For example, suppose that the MCU is configured to receive video data from person A at 30 frames/second (fps) and transmit mixed video data at 30 fps to person A. The MCU is also configured to receive video data from person B at 10 fps and from person C at 5 fps. As the frame rate to and from person A is set to 30 fps, the MCU encodes and transmits a mixed video at 30 fps to person A. But when a mixed video being transmitted to person A only contains videos of persons B and C, for example, the video would be transmitted at a needlessly high frame rate if transmitted at 30 fps. Granted that transmission and reception frame rates between the MCU and person A are set to be asymmetric such that the MCU receives video data from person A at 30 fps and transmits mixed video data to person A at 25 fps, a video of a needlessly high frame rate will be transmitted in this case as well.

Likewise, consider a three-party conference and focus attention to bit rate as an encoding parameter. For example, suppose the MCU is configured to receive video data from person A at 1.5 Mbits/second (bps) and transmit mixed video data to person A at 1.5 Mbps. Likewise, the MCU is configured to receive video data from person B at 128 kbps and from person C at 768 kbps. Since the bit rate to and from person A is set to 1.5 Mbps, the MCU encodes and transmits a mixed video at 1.5 Mbps to person A. But when a mixed video being transmitted to person A contains only videos of persons B and C, for instance, the video would be transmitted at a needlessly high frame rate if transmitted at 1.5 Mbps.

SUMMARY OF THE INVENTION

According to an aspect of the present invention, there is provided with a mixed video delivering apparatus, comprising:

a video receiving unit configured to receive first to Nth (N being an integer more than 1) encoded video data, from first to Nth terminals;

a decoding unit configured to decode the first to Nth encoded video data to obtain first to Nth decoded video data;

a video mixing unit configured to mix the first to Nth decoded video data to obtain mixed video data representing a mixed video to be transmitted to a terminal "A" which is one of the first to Nth terminals;

an encoding parameter storage having stored therein first to Nth encoding parameters which are used for encoding the first to Nth videos by the first to Nth terminals;

an encoding parameter selecting unit configured to select an encoding parameter which is used by any one of terminals other than the terminal A, from the encoding parameter storage;

an encoding unit configured to encode the mixed video data with a selected encoding parameter to obtain encoded mixed video data; and a video transmitting unit configured to transmit the encoded mixed video data to the terminal A.

According to an aspect of the present invention, there is provided with a mixed video delivering method, comprising:

receiving first to Nth (N being an integer more than 1) encoded video data, from first to Nth terminals;

decoding the first to Nth encoded video data to obtain first to Nth decoded video data;

mixing the first to Nth decoded video data to obtain mixed video data representing a mixed video to be transmitted to a terminal "A" which is one of the first to Nth terminals;

selecting an encoding parameter which is used by any one of terminals other than the terminal A from an encoding parameter storage having stored therein first to Nth encoding parameters which are used for encoding the first to Nth videos by the first to Nth terminals;

encoding the mixed video data with a selected encoding parameter to obtain encoded mixed video data; and transmitting the encoded mixed video data to the terminal A.

According to an aspect of the present invention, there is provided with a computer storage medium storing a computer program for causing a computer to execute instructions to perform the steps of:

receiving first to Nth (N being an integer more than 1) encoded video data, from first to Nth terminals;

decoding the first to Nth encoded video data to obtain first to Nth decoded video data;

mixing the first to Nth decoded video data to obtain mixed video data representing a mixed video to be transmitted to a terminal "A" which is one of the first to Nth terminals;

selecting an encoding parameter which is used by any one of terminals other than the terminal A from an encoding parameter storage having stored therein first to Nth encoding parameters which are used for encoding the first to Nth videos by the first to Nth terminals;

encoding the mixed video data with a selected encoding parameter to obtain encoded mixed video data; and transmitting the encoded mixed video data to the terminal A.

BRIEF DESCRIPTION OF THE DRAWINGS

FIG. 8 shows an example of default layout information for a mixed video according to the first embodiment of the present invention;

FIG. 10 shows an example of layout information for a mixed video after layout change according to the first embodiment of the present invention;

FIG. 14 shows information that is utilized for deciding an encoding parameter according to the second embodiment of the present invention;

FIG. 15 shows information that is utilized for deciding an encoding parameter according to a third embodiment of the present invention;

FIG. 17 shows an example of layout information for a mixed video after layout change according to the fourth embodiment of the present invention.

DETAILED DESCRIPTION OF THE INVENTION

First Embodiment

First, the overview of this embodiment is described.

This embodiment is characterized in that it decides the frame rate of a mixed video for use at the time of encoding based on layout information showing the layout of videos contained in the mixed video and the frame rate of each video data and transmits encoded mixed video data resulting from encoding mixed video data at that frame rate.

More specifically, a mixed video is encoded at the frame rate of a video that draws the most attention from users (or a dominant video) among videos contained in the mixed video. A dominant video refers to a video that is most prominent for users within a mixed video. In this embodiment, a dominant video is a video that occupies the largest area in the layout of a mixed video.

By way of example, suppose that a Multipoint Control Unit (MCU) is configured to receive video data from person A at 30 fps, from person B at 10 fps, and from person C at 5 fps. If the video of person B occupies the largest area in the layout of a mixed video to be transmitted to person A, the mixed video is transmitted to person A at 10 fps.

By controlling the frame rate in accordance with the layout of a mixed video in this manner, transmission of redundant video data is prevented and wasted traffic on a network is reduced.

The first embodiment of the present invention will be described in detail below with reference to drawings.

Figure 1:
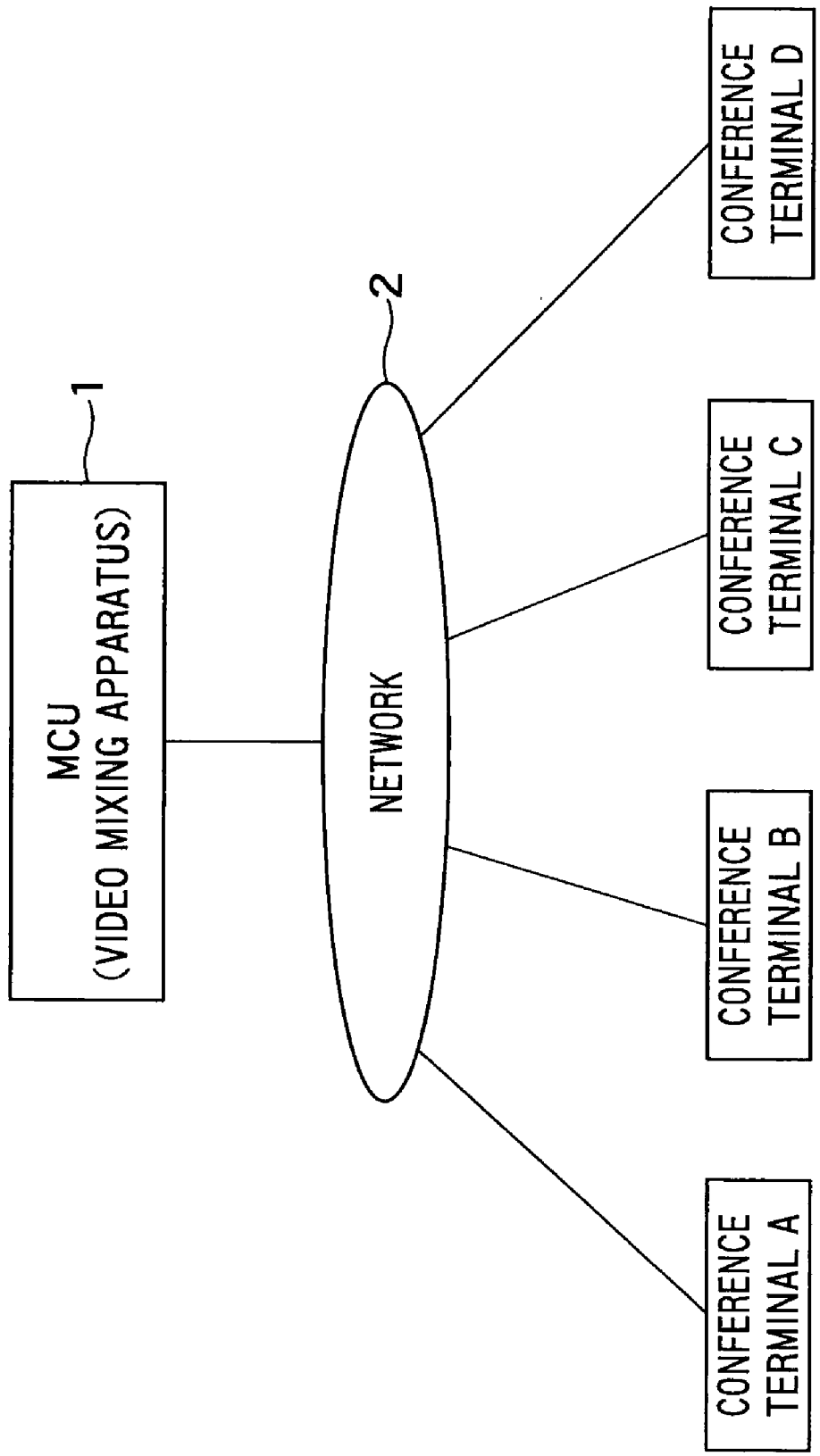
FIG. 1 shows a system configuration of a videoconference system according to a first embodiment of the present invention.

FIG. 1 shows an exemplary configuration of a multipoint videoconference system according to the present invention. In the exemplary configuration of FIG. 1, each of four conference terminals A, B, C and D is connected with a multipoint control unit (MCU) 1 as an embodiment of the present invention via a network. The MCU 1 has functions for generating a mixed video for each conference terminal from videos transmitted from the four conference terminals A, B, C, and D and delivering the mixed video to the conference terminals A, B, C, and D.

First, the conference terminals with which the MCU 1 serving as the mixed video delivering apparatus of the present invention communicates will be described.

Although not shown, each of the conference terminals A to D has a camera device for capturing an input video. Also, although not shown, each of the conference terminals A to D has a display device for displaying a mixed video and functions as a display terminal for displaying a mixed video. The conference terminals each transmit a video captured by the camera device to the MCU 1. Upon receiving a mixed video transmitted from the MCU 1, the conference terminals each display the video on the display device. The conference terminals may be realized as potable notebook personal computers (or notebook PCs), for example. A notebook PC has a display and, even if it does not contain camera functions in its main body, it has USB connection terminals, to which a camera device can be connected. The notebook PC also has an interface for network communication to which a LAN cable is connected.

In a notebook PC operating as a conference terminal, a processor (CPU) executes an operating system (OS) and various application programs that are loaded from a hard disk to main memory. When the notebook PC is functioning as a conference terminal, the following programs are in operation; (1) a transmission/reception program for controlling transmission and reception of video data utilizing the network interface; (2) a video acquisition program for acquiring a video by controlling the camera device; (3) a video compression program for compressing or encoding video data acquired by the video acquisition program in MPEG4 format or the like; (4) a transmission program for transmitting compressed video data from the network interface onto a network 2; (5) a reception program for receiving compressed mixed video data from the network 2 via the network interface; (6) a video decompression program for decompressing mixed video data which is compressed in MPEG4 or a like format; and (7) a display control program for displaying a video decompressed by the video decompression program on a display.

When the notebook PC functions as a conference terminal, (8) a communication session program for controlling a session protocol by which a communication session with the MCU and/or other conference terminals is established, maintained and deleted, is in operation as an application program. Packets conforming to the session protocol are transmitted and received via the network interface just as video data. When the communication session program determines that video communication can be started, the programs (1) to (7) go into operation, and when the communication session program determines that the video communication can be terminated, the programs (1) to (7) stop operation. In this embodiment, the conference terminal also has a function for changing the layout of a mixed video: it has functions for displaying a user screen on the display on which the user of the conference terminal can request a change to the layout, and transmitting information on the change to the MCU 1 via the network 2. As an application program for realizing this layout change function, (9) a program for displaying a screen for layout change and providing information on a change, is also in operation.

The internal configuration of the conference terminal is not essential for the present invention and what is described above is merely an example. The conference terminal may also be a device dedicated to conferencing, instead of a general-purpose device such as a notebook PC. Also, although a videoconference system requires such functions as voice communication and speech synthesis, no description on speech is provided because the present invention pertains to video processing.

Next, the MCU 1 will be described that serves as the mixed video delivering apparatus of the present invention.

Figure 2:
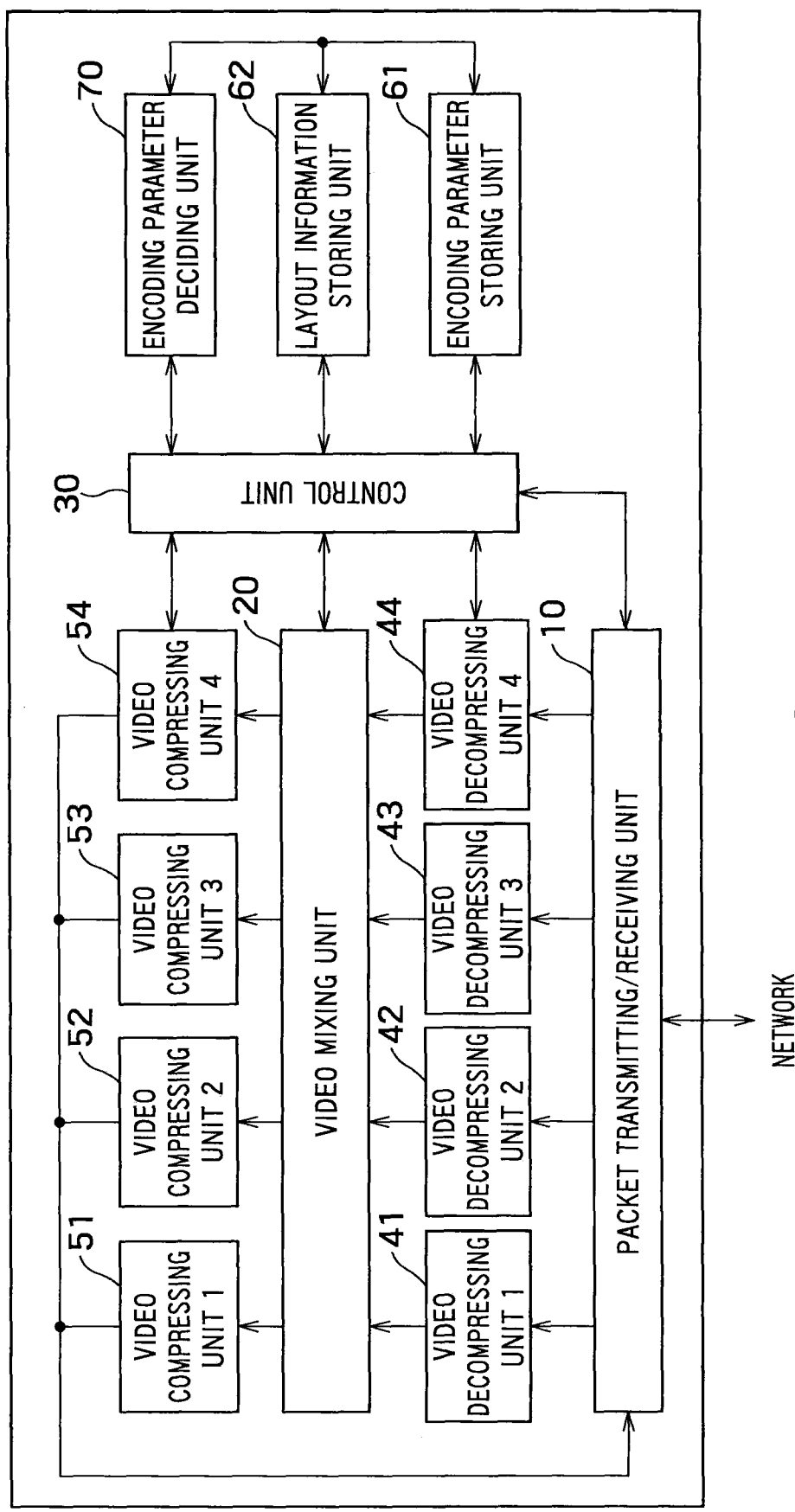
FIG. 2 shows an internal configuration of an MCU according to the first embodiment of the present invention.

FIG. 2 shows the internal configuration of the MCU 1. The MCU 1 includes, as its components, a packet transmitting/receiving unit (video receiving unit, video transmitting unit, and layout change instruction receiver) 10, video decompressing units (decoding units) 41 to 44, a video mixing unit 20, video compressing units (encoding units) 51 to 54, a control unit 30 for performing processing including update of layout information, an encoding parameter storing unit 61, a layout information storing unit 62, and an encoding parameter deciding unit (encoding parameter selecting unit) 70.

The packet transmitting/receiving unit 10 has functions for receiving video data which is compressed and encoded in MPEG4 format from the network 2 according to Real-time Transport Protocol (RTP), which is a communication protocol, and outputting the video data to the video decompressing units 41 to 44. The packet transmitting/receiving unit 10 is also capable of receiving video data transmitted from a plurality of conference terminals, and in that case, is capable of separately processing video data from each of the conference terminals. In this embodiment, four types of video data are received because the MCU 1 communicates with the four conference terminals A to D simultaneously. The four types of video data are separated from each other and then output to a corresponding one of the video decompressing units 41 to 44.

With input of received video data which is compressed/encoded in MPEG4 or a like format, the video decompressing units 41 to 44 decompress or decode the data to generate non-compressed videos. The non-compressed videos generated by the video decompressing units 41 to 44 are output to the video mixing unit 20. It is assumed that information necessary for decompressing video data is different from one video data to another, that is, different among the video decompressing units 41 to 44, and such information is stored in the encoding parameter storing unit 61 and supplied to the video decompressing units 41 to 44 via the control unit 30.

The video mixing unit 20 receives four types of non-compressed videos from the video decompressing units 41 to 44 and uses the four types of videos to generate a mixed video. This embodiment assumes that the video mixing unit 20 is capable of generating four types of different mixed videos. Layout information for a mixed video that is required for generating four types of mixed videos is stored in the layout information storing unit 62 for each conference terminal and supplied to the video mixing unit 20 via the control unit 30. A mixed video is also a non-compressed video.

The video compressing units 51 to 54 generate mixed video data by compressing or encoding non-compressed mixed videos input from the video mixing unit 20 in MPEG4 format or the like. The compressed mixed video data generated by the video compressing units 51 to 54 are output to the packet transmitting/receiving unit 10. It is assumed that information necessary for compressing a mixed video is different from one mixed video to another, that is, different among the video compressing units 51 to 54, and such information is stored in the encoding parameter storing unit 61 and supplied to the video compressing units 51 to 54 via the control unit 30.

Upon input of mixed video data from the video compressing units 51 to 54, the packet transmitting/receiving unit 10 transmits the mixed video data to the network 2 according to a communication protocol, RTP (Real-time Transport Protocol). The packet transmitting/receiving unit 10 is also capable of transmitting mixed video data to a plurality of conference terminals, and in this embodiment, it transmits mixed video data input from the video compressing units 51 to 54 to the corresponding four conference terminals A to D.

The control unit 30 has functions for activating and deactivating the video decompressing units 41 to 44 and video compressing units 51 to 54, and individually supplies each of the video decompressing units 41 to 44 with parameters for decompression and each of the video compressing units 51 to 54 with parameters for compression. The control unit 30 also supplies the video mixing unit 20 with mixed video layout information which is required for generating four types of mixed videos. The control unit 30 also supplies the packet transmitting/receiving unit 10 with correspondence information showing to which one of the video decompressing units (41 to 44) video data received from the conference terminals A to D should be input and to which one of the conference terminals (A to D) video data input from the video compressing units 51 to 54 should be transmitted.

In this embodiment, the conference terminal A, the video decompressing unit 41 and video compressing unit 51 in the MCU 1 correspond with each other; the conference terminal B, the video decompressing unit 42 and video compressing unit 52 in the MCU 1 correspond with each other; the conference terminal C, the video decompressing unit 43 and video compressing unit 53 in the MCU 1 correspond with each other; and the conference terminal D, the video decompressing unit 44 and video compressing unit 54 in the MCU 1 correspond with each other.

Figure 3:
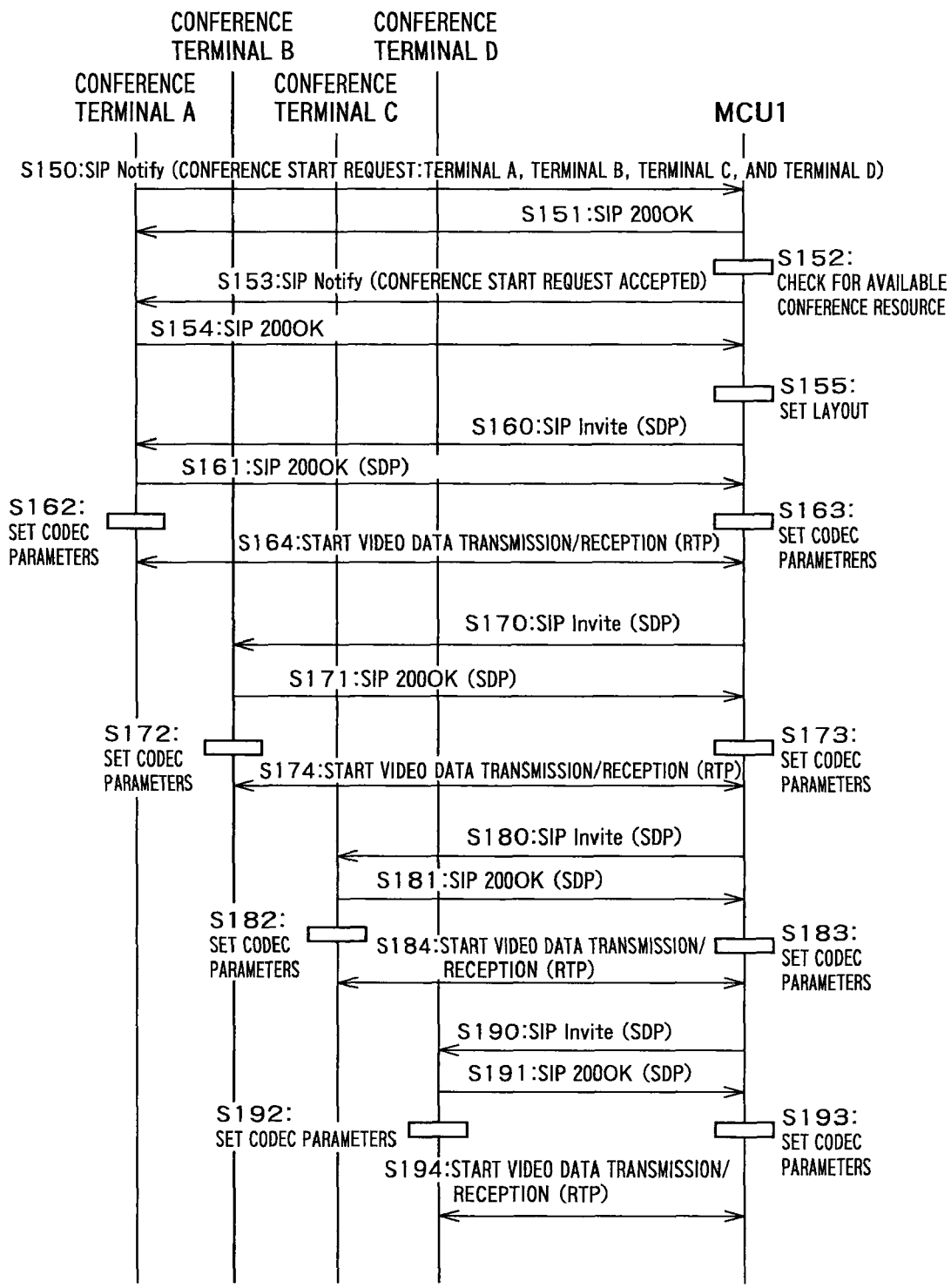
FIG. 3 shows a communication session establishing sequence between the MCU and conference terminals according to the first embodiment of the present invention.
Figure 4:
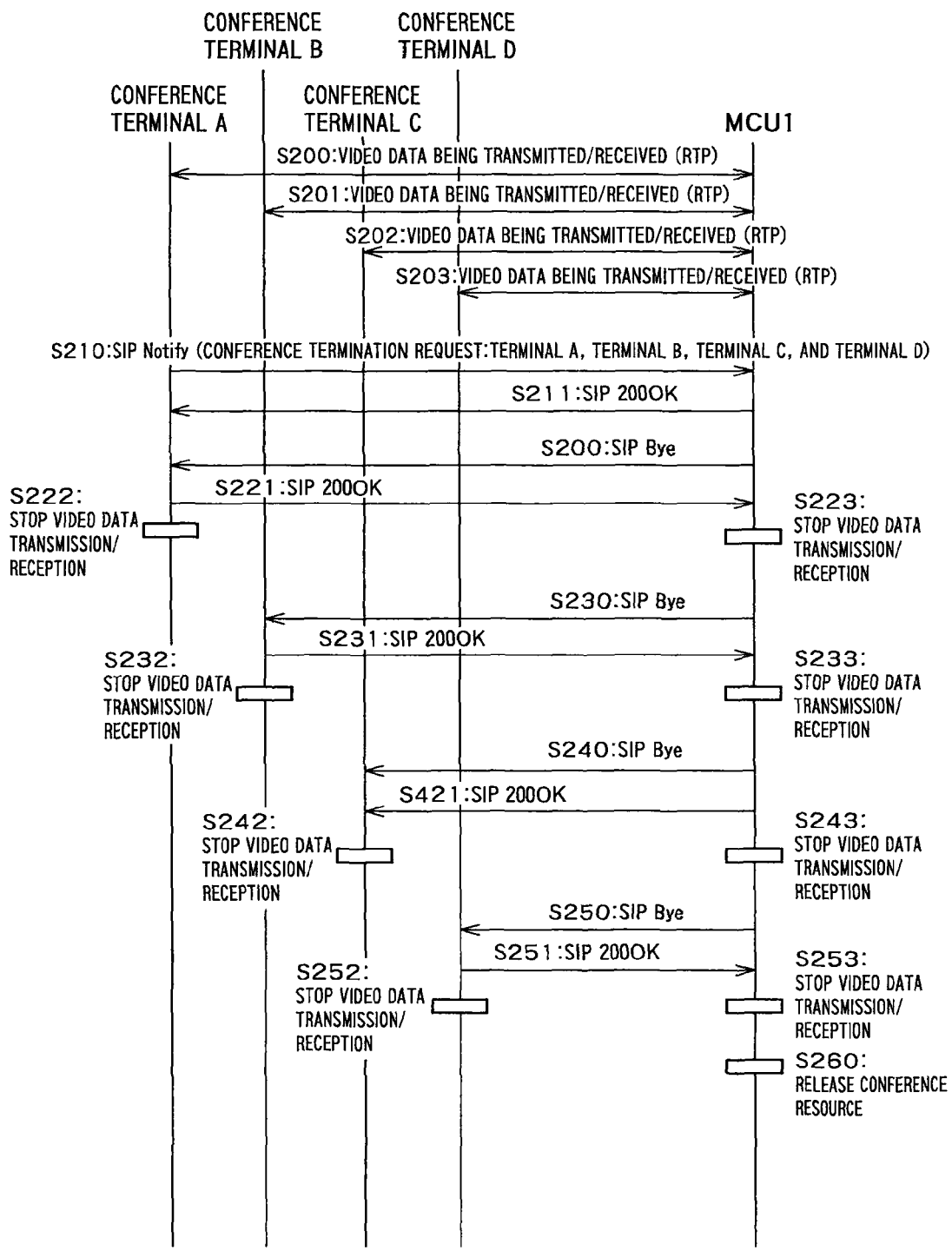
FIG. 4 shows a communication session terminating sequence between the MCU and conference terminals according to the first embodiment of the present invention.

Furthermore, the control unit 30 of the MCU 1 has functions for establishing a communication session with each conference terminal and exchanging information required for receiving videos through the established communication session. FIG. 3 shows an example of a session generating sequence using Session Initiate Protocol (SIP), and FIG. 4 shows an example of a session terminating sequence using SIP. The sequences of FIGS. 3 and 4 show the overview of SIP and omit the description of ACK signal, which is transmitted upon reception of 200 OK by the MCU 1 after sending Invite signal, for instance. The control unit 30 of the MCU 1 transmits and receives control data shown in the session generating and terminating sequences to and from the conference terminals A to D via the packet transmitting/receiving unit 10.

The sequence of FIG. 3 will be described. First, when establishment of a conference is requested by the conference terminal A with SIP Notify signal (S150), the control unit 30 of the MCU 1 sends back a response in order to notify the conference terminal A of the reception of the request (S513).

The control unit 30 determines whether the conference requested by the conference terminal A can be established or not (S152). Whether a conference can be established or not is determined based on the number of participants in the requested conference and the number of video decompressing and compressing units that are available in the MCU 1 (i.e., the number of available conference resources).

Since in FIG. 3 the request for conference establishment requests establishment of a conference among four conference terminals A, B, C, and D, it is determined that the conference can be established if the video decompressing units 41 to 44 and video compressing units 51 to 54 are not in use. However, when establishment of a conference among three terminals has been previously requested and the video decompressing units 41, 42 and 43, and the video compressing units 51, 52 and 53 are being used, it is determined that the conference requested cannot be established.

If the conference can be established, the control unit 30 reduces the number of available conference resources and then notifies with Notify signal the conference terminal A of the result of the conference start request which indicates that the conference can be established (S153). If it is impossible to establish the conference, the control unit 30 similarly notifies the conference terminal A of the impossibility with Notify signal.

Upon receiving a response to the conference start request from the conference terminal A (S154), the control unit 30 decides layout information for generating a mixed video (S155). For a four-party conference, for example, a layout of 4-part split screen is employed as the default value, although a different layout may be utilized. In a 4-part split layout, the videos of the four parties are positioned in the same arrangement at upper left, upper right, lower left, and lower right in mixed videos transmitted to all the conference terminals, but the arrangement of the videos may vary from a conference terminal to another. This layout information is stored in the layout information storing unit 62.

After deciding layout information, the control unit 30 establishes communication sessions with the conference terminals A, B, C and D. In FIG. 3, Invite signal as a session generating instruction is first transmitted to the conference terminal A (S160). This Invite signal is added with such pieces of information as a compression method (such as MPEG4), image size (e.g., 640 pixels wide and 480 pixels high), frame rate (e.g., 30 frames/second), and bit rate (e.g., 1.5 Mbps) as encoding parameters for a video that can be compressed and/or decompressed by the MCU 1.

Upon receiving a response to the session generating instruction from the conference terminal A (S161), the control unit 30 detects from the response such pieces of information as a compression method, image size, frame rate, and bit rate, which are encoding parameters for a video that can be compressed and decompressed by the conference terminal A.

The control unit 30 compares the parameters of the MCU 1 with those of the conference terminal A and decides encoding parameters for video data to be transmitted to the conference terminal A and encoding parameters for video data to be received from the conference terminal A (S163).

The conference terminal A similarly compares the encoding parameters of the MCU 1 with those of the conference terminal A and sets encoding parameters for video data to be transmitted to the MCU 1 and encoding parameters for video data to be received from the MCU 1 (S162).

In this embodiment, when setting encoding parameters, the MCU 1 and the conference terminal A adopt the lower of encoding parameters provided by the both parties. For example, when the MCU 1 provides a bit rate of 1.5 Mbps and the conference terminal A provides a bit rate of 768 kbps, they adopt the lower of the values and thus transmit and receive at the bit rate of 768 kbps.

Information on the encoding parameter set between the MCU 1 and the conference terminal A is stored in the encoding parameter storing unit 61 as information for the MCU 1 and the conference terminal A. Thereafter, the control unit 30 instructs components of the MCU 1 to start transmission and reception of video data in accordance with the encoding parameters that have been set between the MCU 1 and the conference terminal A, causing videos to be transmitted and received (S164).

Just as the process between the MCU 1 and the conference terminal A, communication sessions are also established between the MCU 1 and the conference terminal B (S170 to S174), the conference terminal C (S180 to S184), and the conference terminal D (S190 to S194), and transmission and reception of videos is started.

The sequence of FIG. 4 is described. While the MCU 1 is transmitting and receiving videos to and from the conference terminals A, B, C, and D (S200, S201, S202, S203), if termination of the conference is requested by the conference terminal A with SIP Notify signal (S210), the control unit 30 of the MCU 1 sends back a response in order to notify the conference terminal A that the request has been received (S211).

Thereafter, the control unit 30 terminates the communication sessions with the conference terminals A, B, C, and D. In FIG. 4, first, Bye signal as a session terminating instruction is transmitted to the conference terminal A (S220). Upon receiving a response to the session terminating instruction from the conference terminal A (S221), the control unit 30 determines that a session terminating procedure has been successful and stops transmission of video data to the conference terminal A and processing of video data received from the conference terminal A (S223).

After sending the response to the session terminating instruction, the conference terminal A also determines that a session terminating procedure has been successful and stops transmission of video data to the MCU 1 and processing of video data received from the MCU 1 (S222).

As a result, the communication session between the MCU 1 and the conference terminal A terminates and transmission/reception of videos also stops. The control unit 30 accordingly deletes information necessary for communication with the conference terminal A which has been stored in the encoding parameter storing unit 61 and the layout information storing unit 62.

Just as between the MCU 1 and the conference terminal A, communication sessions and video transmission/reception are also terminated between the MCU 1 and conference terminal B (S230 to S233), between the MCU 1 and conference terminal C (S240 to S243), and between the MCU 1 and conference terminal D (S250 to S253), and information stored in the encoding parameter storing unit 61 and the layout information storing unit 62 is deleted. Thereafter, the control unit 30 releases conference resources (the video decompressing units 41 to 44 and video compressing units 51 to 54) that have been used for the conference among the conference terminals A to D (S260).

Figure 5:
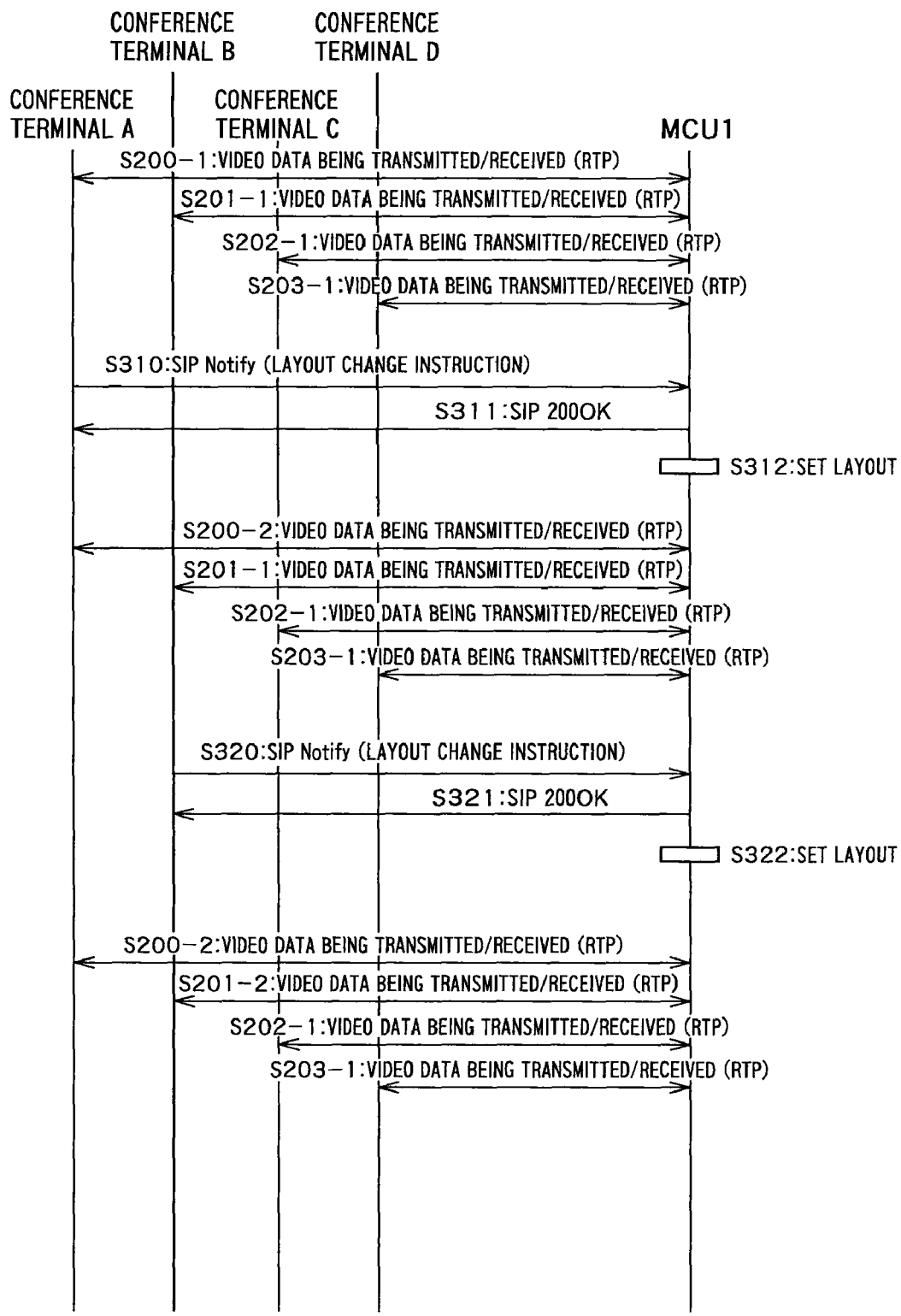
FIG. 5 shows a sequence of layout change on the MCU and conference terminals according to the first embodiment of the present invention.

FIG. 5 shows a sequence of processing a layout change instruction. While the MCU 1 is transmitting and receiving videos to and from the conference terminals A, B, C, and D (S200-1, S201-1, S202-1, S203-1), if change of layout is requested by the conference terminal A with SIP Notify signal (S310), the control unit 30 of the MCU 1 returns a response in order to notify the conference terminal A of reception of the request (S311).

The control unit 30 changes the mixed video layout information for the conference terminal A which is stored in the layout information storing unit 62 to layout information requested (S312).

As a result, the screen layout of a mixed video for the conference terminal A which is generated by the video mixing unit 20 is changed, and a mixed video with its layout changed is transmitted to the conference terminal A (S200-2).

When layout change is requested by the conference terminal B with SIP Notify signal (S320), the control unit 30 of the MCU 1 returns a response in order to notify the conference terminal B of reception of the request (S321).

The control unit 30 changes the mixed video layout information for the conference terminal B stored in the layout information storing unit 62 to layout information requested (S322).

As a result, the screen layout of a mixed video for the conference terminal B which is generated by the video mixing unit 20 is changed, and a mixed video with its layout changed is transmitted to the conference terminal B (S201-2).

Now, the encoding parameter deciding unit 70 shown in FIG. 2, which characterizes the present invention, will be described.

When a communication session has been established and a conference has been started, the control unit 30 notifies the encoding parameter deciding unit 70 of conference information. For example, when a four-party conference is established in accordance with the procedure of FIG. 3, the control unit 30 notifies, as conference information, information that a conference is being established among the conference terminals A, B, C and D, and information on correspondence between those conference terminals and the video decompressing units 41 to 44 and the video compressing units 51 to 54.

Figures 6, 7:
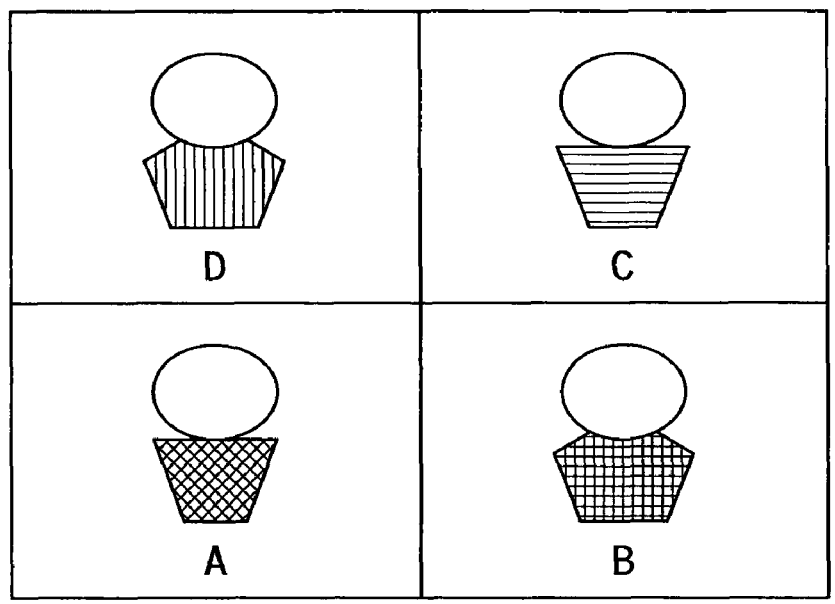
FIG. 6 shows information that is utilized for deciding an encoding parameter according to the first embodiment of the present invention.
FIG. 7 shows an example of default layout screen of a mixed video according to the first embodiment of the present invention.

Upon notification of the conference information, the encoding parameter deciding unit 70 creates a table of information, such as the one shown in FIG. 6, on frame rates to be applied to each of the conference terminals with reference to information stored in the encoding parameter storing unit 61.

In FIG. 6, video data numbers 1, 2, 3 and 4 correspond to the conference terminals A, B, C and D, respectively, showing that the frame rate of a video received from and the default frame rate of a mixed video transmitted to the conference terminal A are 30 fps, the frame rate of a video received from and the default frame rate of a mixed video transmitted to the conference terminal B are 20 fps, the frame rate of a video received from and the default frame rate of a mixed video transmitted to the conference terminal C are 20 fps, and the frame rate of a video received from and the default frame rate of a mixed video transmitted to the conference terminal D are 10 fps. Although this table shows the frame rates of videos received from the individual conference terminals and the default frame rates of mixed videos transmitted to the conference terminals together, these pieces of information may also be each stored in separate tables.

Assume that, in a communication session established between the MCU 1 and the conference terminal A, MPEG4 is set as the compression method for video data transmitted and received between the MCU 1 and the conference terminal A, the image size is set to 640 pixels wide and 480 pixels high, the frame rate is to 30 fps, and the bit rate is to 1.5 Mbps. Also assume that the default layout of a mixed video transmitted to the conference terminal A is 4-part split and videos transmitted from the conference terminals are arranged in a mixed video as depicted in FIG. 7. Mixed video layout information for the conference terminal A which is stored in the layout information storing unit 62 in this case is shown FIG. 8.

In FIG. 8, "input video" is identification information of a video transmitted from a conference terminal, "use for mixing" is information showing whether the video should be utilized in generating a mixed video, "reduction factor" is information showing the size proportion of the video relative to a mixed video when the video is utilized for generating a mixed video, and "positioning information" includes coordinate information (X and Y coordinates) indicative of the position for placing the video and information indicative of a layer at which the video should be placed.

Figure 9:
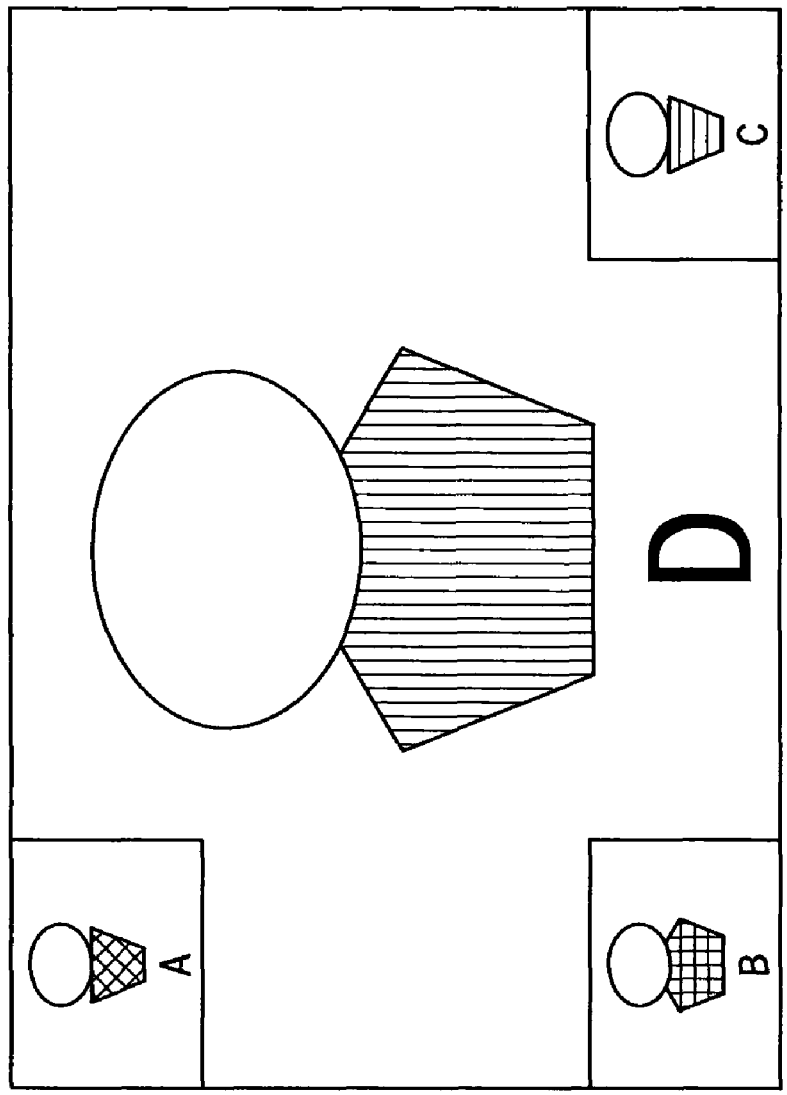
FIG. 9 shows an example of a screen for a mixed video after layout change according to the first embodiment of the present invention.

Suppose that the control unit 30 receives a layout change instruction from the conference terminal A while it is transmitting a mixed video of the default layout having a size of 640 pixels wide and 480 pixels high to the conference terminal A at a frame rate of 30 fps and a bit rate of 1.5 Mbps. Upon receiving the layout change instruction, the control unit 30 rewrites or updates the mixed video layout information for the conference terminal A stored in the layout information storing unit 62 to layout information corresponding to the instruction. By way of example, when an instruction to change to the layout shown in FIG. 9 is received, the control unit 30 rewrites the mixed video layout information for the conference terminal A which is stored in the layout information storing unit 62 (see FIG. 8) to the information shown in FIG. 10.

After rewriting the layout information stored in the layout information storing unit 62, the control unit 30 notifies the encoding parameter deciding unit 70 of the layout information that was changed. Upon being notified of the change to layout information, the encoding parameter deciding unit 70 analyzes the layout information that was changed. For instance, when the layout of a mixed video to the conference terminal A is changed from the one of FIG. 8 to the one of FIG. 10, the encoding parameter deciding unit 70 analyzes the layout information of FIG. 10.

This analysis (1) identifies an input video that is dominant in terms of size in the mixed video, and (2) detects the frame rate of the dominant input video identified. Analysis of the layout information shown in FIG. 10 reveals that video number 4 is the dominant input video and that the video number 4 is being transmitted at a frame rate of 10 fps from the conference terminal D to the MCU 1 from FIG. 6. The dominant input video may also be detected from among input videos from other conference terminals except the input video from the conference terminal that requested change of layout information.

After the analysis, the encoding parameter deciding unit 70 determines whether or not to change an encoding parameter (here, the frame rate) of a mixed video being transmitted to the conference terminal. If the current frame rate of the mixed video (initially, the default frame rate of the mixed video that is set when a communication session is established) is different from that of the dominant video after layout change, the encoding parameter deciding unit 70 decides to change the frame rate of the mixed video being transmitted to the conference terminal.

More specifically, when the frame rate of the dominant video after layout change is equal to or lower than the default frame rate that was set when the communication session was established, the encoding parameter deciding unit 70 decides to change the frame rate of the mixed video to that of the dominant video. If the frame rate of the dominant video is higher than the default frame rate, the encoding parameter deciding unit 70 decides to change the frame rate of the mixed video being transmitted to the conference terminal to the default frame rate in consideration of the possibility that the conference terminal does not support the higher frame rate. However, if the conference terminal is capable of supporting the higher frame rate, the frame rate of the mixed video being transmitted to the conference terminal may be changed to the higher frame rate.

In the present example, since the current frame rate (the default frame rate) for the conference terminal A is 30 fps and that of the dominant video (video number 4) is 10 fps, the encoding parameter deciding unit 70 decides to change the frame rate of the mixed video (30 fps) to that of the dominant video (10 fps). Then, the encoding parameter deciding unit 70 issues a compulsive instruction for encoding parameter change via the control unit 30 to the video compressing unit 51 corresponding to the conference terminal A so that the frame rate of the mixed video transmitted to the conference terminal A is set to the lower value (10 fps).

Upon receiving the compulsive instruction for encoding parameter change, the video compressing units 51 to 54 generate compressed data utilizing information that has been provided in the instruction, instead of generating compressed video data using information stored in the encoding parameter storing unit 61 as would otherwise done. In the case of the conference terminal A, the video compressing unit 51 generates compressed video data with a frame rate of 10 fps instead of using 30 fps as in normal circumstances. When the frame rate is lowered, the bit rate is also lowered (however, given that the number of bits per frame remains unchanged) and thus redundant network load can be reduced. Because the frame rate of the dominant video to which the users pay attention is maintained, the quality of the dominant video is reserved even though the frame rate of the mixed video is lowered. When the bit rate is kept constant despite reduction of the frame rate, video quality is expected to improve because the compression ratio of the video becomes lower.

When the conference terminal supports a frame rate higher than the default frame rate of the mixed video and the frame rate of the mixed video is changed to the higher frame rate as mentioned above, network load will be increased as compared with when the default frame rate is used. Nevertheless, the increase in network load in that case is considered to be not meaningless because users are paying attention to the video transmitted at this high frame rate.

Figure 11:
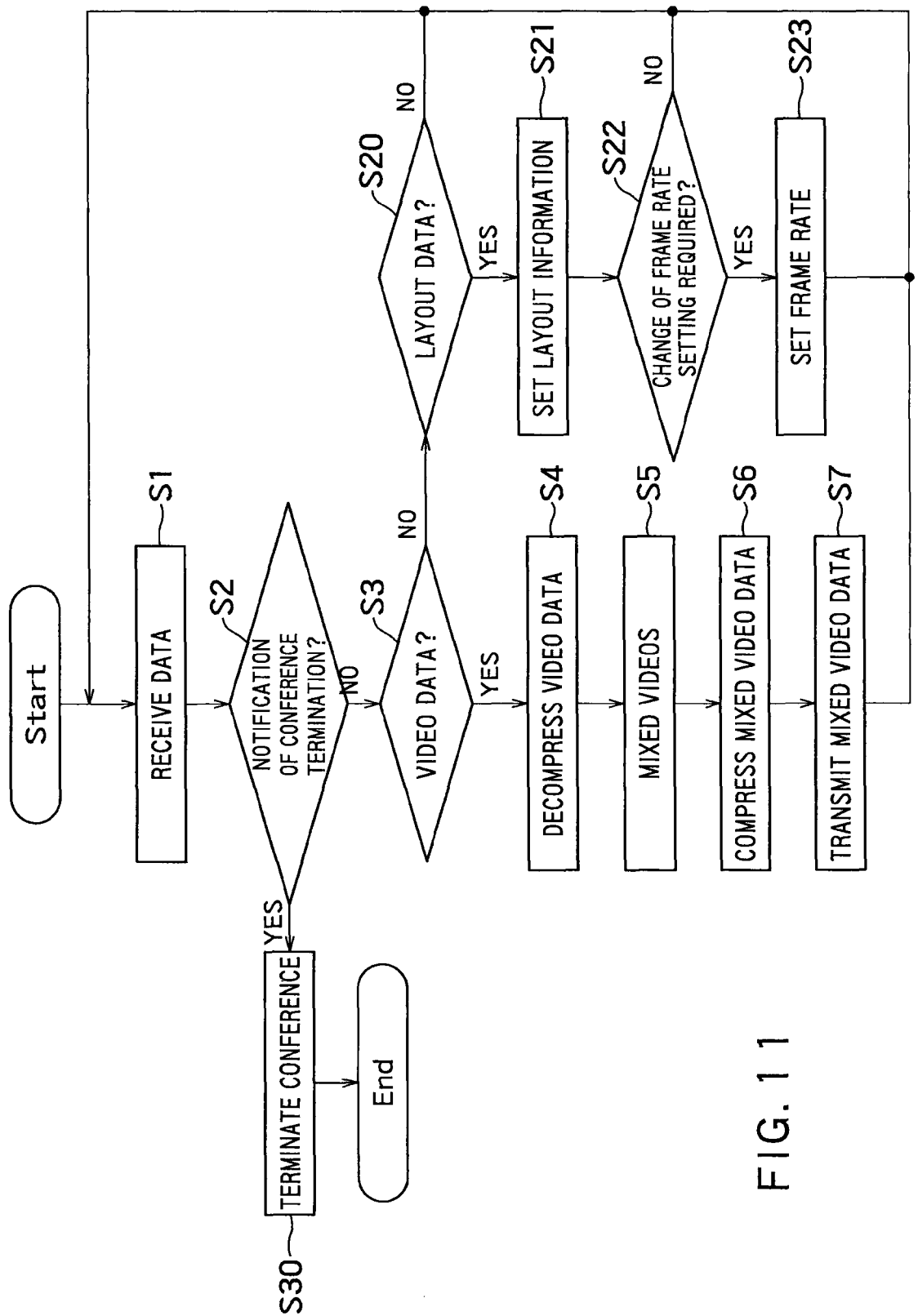
FIG. 11 is a flowchart illustrating operations performed upon receiving a layout change instruction during transmission and reception of video data according to the first embodiment of the present invention.

FIG. 11 is a flowchart generally illustrating the operational sequence of the MCU 1 after a conference is started.

When the MCU 1 receives data from a conference terminal via the network 2 (S1), it determines whether the received data contains a notification of conference termination (see S210 of FIG. 4) (S2). If the data contains a notification of conference termination, the MCU 1 terminates the conference in accordance with such a sequence as shown in FIG. 4 (S30).

When the received data does not contain a notification of conference termination, the MCU 1 determines whether the received data is video data or not (S3). If the data is video data, the MCU 1 decompresses the video data (S4), combines the decompressed video data with decompressed video data from other conference terminals to generate mixed video data, compresses the mixed video data (S6), and transmits the compressed mixed video data (S7). Thereafter, the flow returns to step S1.

If the received data is not video data, the MCU 1 determines whether the received data is layout data (a layout change instruction) (S20). If the data is not layout data, the MCU 1 performs processing appropriate for the type of the data, and the flow returns to S1.

On the other hand, if the received data is layout data, the MCU 1 updates layout information in the layout information storing unit 62 (S21), and then identifies a dominant input video in the layout information. If the frame rate of the dominant input video identified is different from the current frame rate, the MCU 1 decides to change the frame rate of the mixed video being transmitted to the conference terminal (S22). However, if the two frame rates match, the MCU 1 decides not to change the frame rate of the mixed video (S22), and the flow returns to step S1. If change of the frame rate of the mixed video is decided and if the frame rate of the dominant input video identified is equal to or lower than the default frame rate of the mixed video, the MCU 1 changes the frame rate of the mixed video to that of the dominant input video identified (S23). Conversely, when the frame rate of the dominant input video identified is higher than the default frame rate of the mixed video, the MCU 1 changes the frame rate of the mixed video to the default frame rate of the mixed video (S23). However, as mentioned above, the frame rate of the mixed video may be changed to the higher frame rate if the conference terminal is capable of supporting the higher frame rate.

Figure 12:
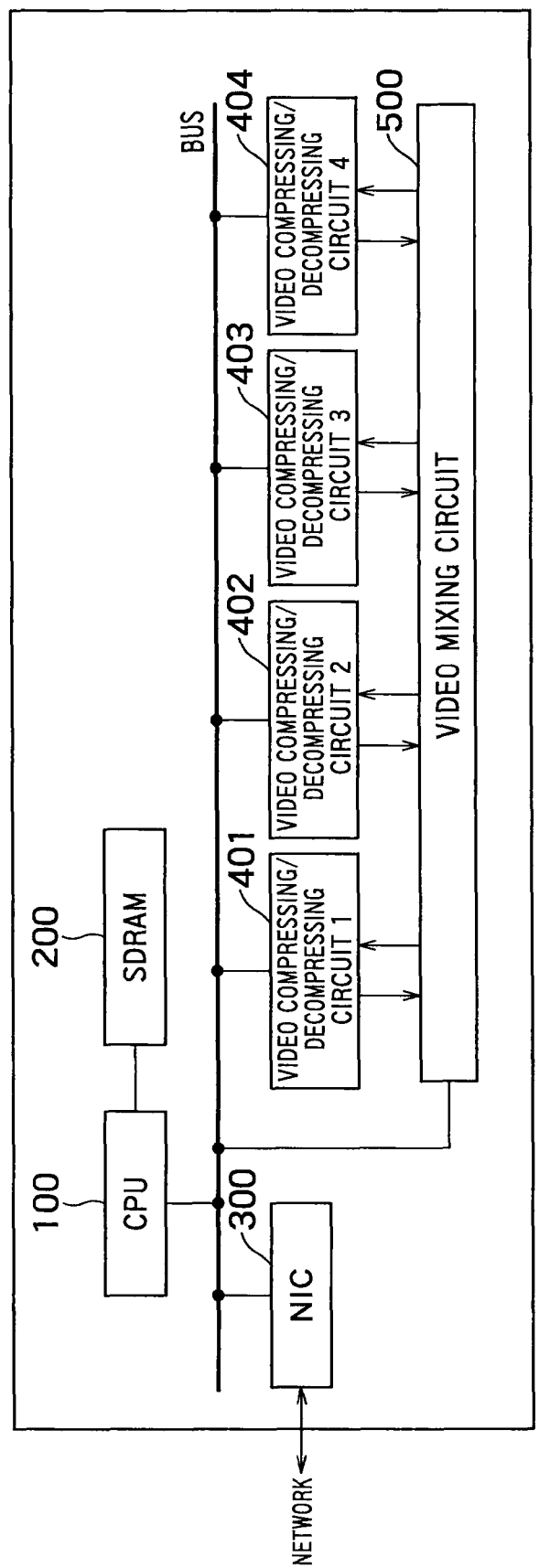
FIG. 12 shows an exemplary system configuration of the MCU according to the first embodiment of the present invention.

FIG. 12 shows an exemplary system configuration of the MCU 1. As shown, the MCU 1 contains a CPU 100, a SDRAM 200, a bus, a Network Interface Card (NIC) 300, video compressing/decompressing circuits 401 to 404, and a video mixing circuit 500.

The CPU 100 is a processor provided for controlling the operation of the MCU 1 and executes various application programs stored in the SDRAM 200 which is memory. The video mixing unit 20, video decompressing units 41 to 44, and video compressing units 51 to 54 shown in FIG. 2 are realized as pieces of dedicated hardware and other components are realized as software. As application programs, (1) a packet transmission/reception control program, (2) a video decompression control program, (3) a video mixing control program, (4) a video compression control program, (5) a communication session generation program, (6) a communication session termination program, (7) a layout information analysis program, and (8) an encoding parameter decision program, are executed by the CPU 100, for example. In FIG. 12, the CPU 100 is connected with other pieces of hardware by a bus. The NIC 300 serves as an interface for communication with the network 2.

As has been described above, according to this embodiment, it is possible to control encoding parameters used at the time of compression in accordance with the layout of a mixed video when a multipoint control unit (MCU) transmits a encoded (or compressed) mixed video to conference terminals. This can prevent transmission of redundant video data to the conference terminals and reduce wasted traffic on a network.

The embodiment above illustrates a case where a dominant input video is identified in layout information for a mixed video being transmitted to a conference terminal and the frame rate of the mixed video being transmitted to the conference terminal is changed to that of the identified video. However, an input video may also be identified through the user's selection. That is, the user of a conference terminal may select a video in a mixed video displayed on a screen and notifies the MCU 1 of the video he/she selected. The MCU 1 changes the frame rate of the mixed video based on the frame rate of the selected video and the default frame rate of the mixed video being transmitted to that conference terminal.

In addition, although the embodiment above shows an example where the frame rate of a mixed video as an encoding parameter is changed, it is also possible to switch between two compression methods having different compression ratios (e.g., of H264 and MPEG4, H264 has a higher compression ratio than MPEG4). By way of example, either one of two compression methods is employed between each of the conference terminals A to D and the MCU 1. When the compression method of a dominant video in the layout of a mixed video being transmitted to the conference terminal A has a higher compression ratio than that of the compression method used by the conference terminal A, the compression method of the conference terminal A is changed to that of the dominant video. This can reduce wasted traffic on the network as well.

Second Embodiment

A second embodiment of the present invention will be described below with reference to drawings.

Figure 13:
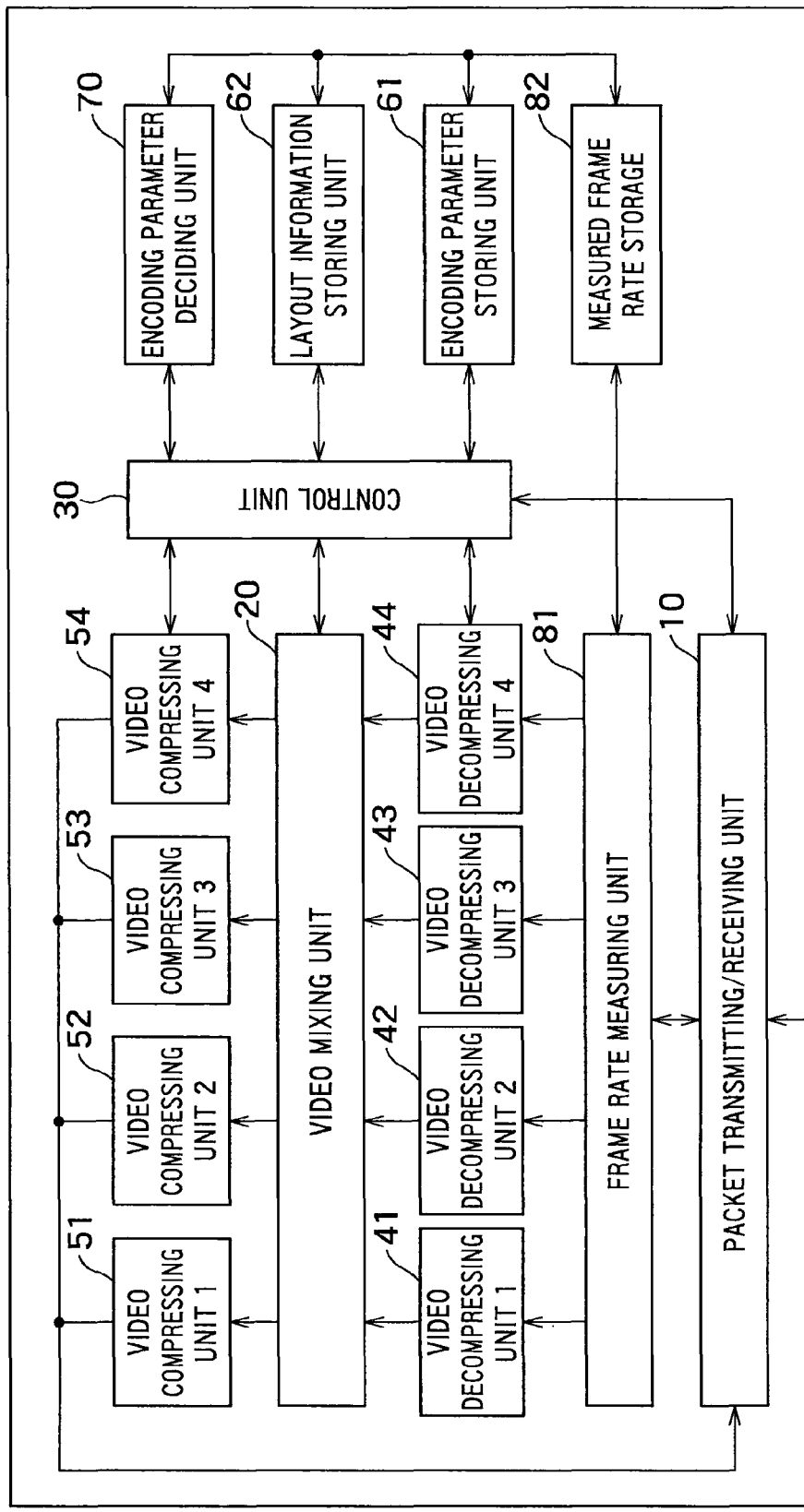
FIG. 13 shows the internal configuration of the MCU according to a second embodiment of the present invention.

FIG. 13 shows the internal configuration of the MCU 1 according to the second embodiment of the invention. A difference from the first embodiment is that the MCU 1 additionally includes a frame rate measuring unit 81 for measuring the frame rates of videos transmitted from conference terminals and a measured frame rate storage 82 for storing information on measured rates.

The first embodiment utilizes a value (set value) that is informed when a communication session is established as an encoding parameter (e.g., frame rate) between the MCU 1 and each conference terminal. But transmission at the frame rate that has been set may actually be impossible depending on the processing capability of a conference terminal. For example, even if a frame rate of 30 fps is set on a conference terminal, the 30 fps frame rate may not be realized when processing load on the conference terminal becomes high, such as when another function is operating in the conference terminal. When the set value is higher than the actual frame rate in such a circumstance, there would be a significant amount of wasted traffic in network if the frame rate of the mixed video is changed to the set value of the dominant video. Accordingly, this embodiment uses the frame rate measured by the frame rate measuring unit 81 for determination of whether to change the frame rate and for change of the frame rate in place of a frame rate (or set value) which is set at the time of establishing a communication session. Hereinafter, the operation of this embodiment will be described in detail.

In the first embodiment, upon notification of conference information, the encoding parameter deciding unit 70 makes reference to information stored in the encoding parameter storing unit 61 to create a table of information on frame rates of video data which are received from conference terminals such as shown in FIG. 6. In the second embodiment, the encoding parameter deciding unit 70 makes reference to information stored in the encoding parameter storing unit 61 as well as measurement information which is measured by the frame rate measuring unit 81 and stored in the measured frame rate storage 82 to create such a table as shown in FIG. 14. The table of FIG. 14 contains set values and measured values of frame rates for video data received from individual conference terminals. Also, when issuing a compulsive instruction for encoding parameter change to one of the video compressing units 51 to 54 that corresponds to a certain conference terminal via the control unit 30, the encoding parameter deciding unit 70 notifies the video compression unit of a measured value, rather than a set value.

For example, if the layout of the mixed video for conference terminal A is changed from the one shown in FIG. 8 to the one of FIG. 10, the encoding parameter deciding unit 70 finds out that video number 4 is the dominant input video. And, from FIG. 14, the encoding parameter deciding unit 70 finds that the set value of frame rate of the number 4 video is 10 fps but a measured value is 5 fps and thus the video is actually being transmitted at 5 fps from the conference terminal D to the MCU 1. As a result of layout change, the measured value (5 fps) of the frame rate of the dominant video becomes lower than the transmission/reception frame rate (30 fps) which was set when the communication session was established between the MCU 1 and the conference terminal A. Therefore, the encoding parameter deciding unit 70 issues a compulsive instruction for encoding parameter change via the control unit 30 to the video compressing unit 51 corresponding to the conference terminal A so that the frame rate of the mixed video being transmitted to the conference terminal A is set to the lower value (5 fps).

In this way, the second embodiment can further reduce unnecessary network load by utilizing a measured value.

Third Embodiment

A third embodiment of the present invention is described below with reference to drawings.

In the first embodiment, upon notification of conference information, the encoding parameter deciding unit 70 makes reference to information stored in the encoding parameter storing unit 61 to create a table of information on frame rates of video data which are received from conference terminals such as shown in FIG. 6. In the third embodiment, in addition to frame rate, other information, such as bit rate information and resolution information, is also included in the table created as shown in FIG. 15. The bit rate information is additionally described below.

The bit rate of videos received from and the default bit rate of a mixed video transmitted to the conference terminal A are 1500 kbps, and the bit rate of videos received from and the default bit rate of a mixed video transmitted to the conference terminal B are 384 kbps. The bit rate of videos received from and the default bit rate of a mixed video transmitted to the conference terminal C are 768 kbps. The bit rate of videos received from and the default bit rate of a mixed video transmitted to the conference terminal D are 768 kbps. Although this table shows the bit rates of videos received from the individual conference terminals and the default bit rates of mixed videos transmitted to the conference terminals together, these pieces of information may also be each stored in separate tables.

In this embodiment, when the layout of the mixed video has been changed, the encoding parameter deciding unit 70 analyzes layout information as in the first embodiment. This analysis (1) identifies an input video which is dominant in the mixed video in terms of size, and (2) detects the bit rate of the dominant input video identified.

If, as a result of layout change on the conference terminal A, the current bit rate (initially, the bit rate which is set on the conference terminal A at the time of establishing a communication session) is different from the bit rate of the dominant video, for example, the encoding parameter deciding unit 70 issues a compulsive instruction for encoding parameter change to the video compressing unit 51 corresponding to the conference terminal A so that the mixed video being transmitted to the conference terminal A will be transmitted at the bit rate of the dominant video. However, when the bit rate of the dominant video is higher than the default bit rate that was set on the conference terminal A when the communication session was established, the encoding parameter deciding unit 70 issues a compulsive instruction for encoding parameter change to the video compressing unit 51 corresponding to the conference terminal A so that the bit rate of the mixed video being transmitted to conference terminal A is put back to the default bit rate. If the conference terminal supports the higher bit rate, however, the bit rate of the mixed video may be changed to the high bit rate.

As has been described, according to this embodiment, it is possible to prevent a mixed video from being transmitted from the MCU 1 to conference terminals at a bit rate that is higher than necessary, and consequently to reduce unnecessary network load.

Fourth Embodiment

In the first embodiment, when the layout of the mixed video for conference terminal A has changed from the one of FIG. 8 to the one of FIG. 10, the encoding parameter deciding unit 70 determines that the number 4 video is the dominant input video. This is because analysis by the encoding parameter deciding unit 70 (1) identifies an input video which is dominant in terms of size in a mixed video, and (2) detects the frame rate of the dominant input video identified.

Figure 16:
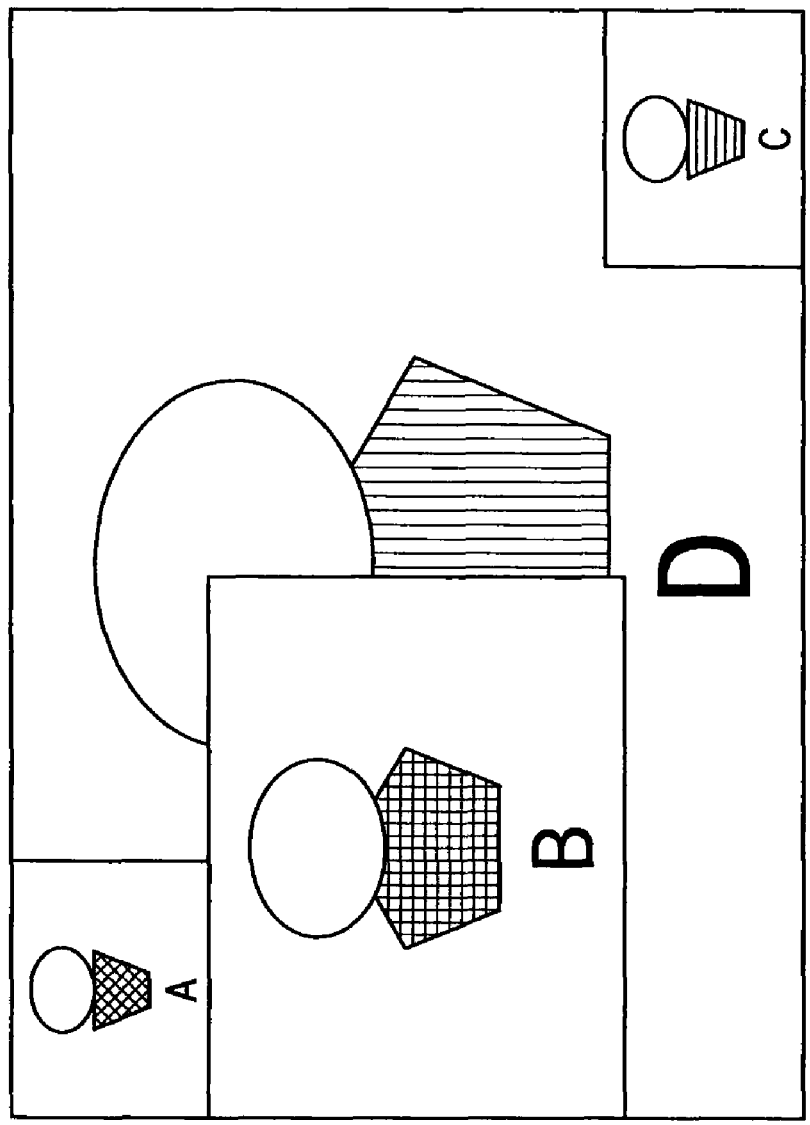
FIG. 16 shows an exemplary screen for a mixed video after layout change according to a fourth embodiment of the present invention.

However, the dominant input video may not necessarily be identified using size information. As another type of information, layer information may be used For instance, in the example of FIG. 10, a video that is positioned on the top of the mixed video is an input video having a layer "3", wherein the dominant input video may be given a number of "3". In this case, the encoding parameter deciding unit 70 issues a compulsive instruction for encoding parameter change to the video compressing unit 51 corresponding to the conference terminal A via the control unit 30 so that the frame rate of the mixed video being transmitted to conference terminal A will be set to 20 fps. Furthermore, as another example, assume that the layout of the mixed video for conference terminal A has changed from the one shown in FIG. 8 to the one shown in FIG. 17. The layout of the screen in this case is the one shown in FIG. 16, where the encoding parameter deciding unit 70 determines that the video numbered "2" which is an input video having a layer "3" is the dominant video.

Both size and layer information may also be used for identifying the dominant input video. For example, one possible method is to determine that an input video having the largest size among input videos that have no video overlying them is the dominant input video.

While the embodiments described above show exemplary configurations of a multipoint videoconference system in which four conference terminals communicate with the MCU 1, the number of conference terminals is not limited to four and the present invention is applicable to any system with at least two conference terminals. Additionally, although it is described above that the one conference terminal transmits videos and receives mixed videos and further transmits layout information, the present invention is also applicable where three separate conference terminals transmit videos, receive mixed videos, and transmit layout information, respectively.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The MCU may be implemented by using, for example, a general purpose computer device as basic hardware. Thus, the a packet transmitting/receiving unit (video receiving unit, video transmitting unit, and layout change instruction receiver) 10, video decompressing units (decoding units) 41 to 44, a video mixing unit 20, video compressing units (encoding units) 51 to 54, a control unit 30 and an encoding parameter deciding unit (encoding parameter selecting unit) 70 may be implemented by causing a processor provided in the above described computer device to execute a program. Then, the MCU may be implemented by previously installing the above described program in the computer device or by installing the program in the computer device as needed. The program to be installed may be stored on a recording medium such as a CD-ROM or distributed though a network. Furthermore, the an encoding parameter storing unit 61 and a layout information storing unit 62 may also be realized using a memory device or hard disk incorporated in or externally added to the above described computer device or a storage medium such as CD-R, CD-RW, DVD-RAM, DVD-R as appropriate.

What is claimed is:

1. A mixed video delivering apparatus, comprising:
a video receiving unit configured to receive first to Nth (N being an integer more than 1) encoded video data, from first to Nth terminals;
a decoding unit configured to decode the first to Nth encoded video data to obtain first to Nth decoded video data;
a video mixing unit configured to mix the first to Nth decoded video data to obtain mixed video data representing a mixed video to be transmitted to a terminal "A" which is one of the first to Nth terminals;
a layout information storage configured to store layout information showing a layout of each video in the mixed video;
a layout change instruction receiver configured to receive from the terminal "A" a layout change instruction requesting a change to the layout information;
a layout information updating unit configured to update the layout information in accordance with the layout change instruction wherein the video mixing unit mixes the first to Nth decoded video data based on the layout information;
a frame rate measuring unit to configured to measure frame rates of the first to Nth videos;
a measured frame rate storage configured to store the frame rates of the first to Nth videos measured by the frame rate measuring unit;
an encoding parameter selecting unit configured to identify a dominant video which is dominant in the mixed video based on the layout information and select the frame rate of the dominant video in the measured frame rate storage;
an encoding unit configured to encode the mixed video data so that the mixed video is transmitted at the frame rate of the dominant video to the terminal A to obtain encoded mixed video data; and
a video transmitting unit configured to transmit the encoded mixed video data to the terminal A.

2. The apparatus according to claim 1, wherein the dominant video is a video having a largest area among videos transmitted by the first to Nth terminals.

3. The apparatus according to claim 1, wherein the dominant video is a video that is positioned uppermost among videos transmitted by the first to Nth terminals.

4. The apparatus according to claim 1, wherein further comprising:
an encoding parameter storage configured to store information on a default frame rate of the mixed video which is predetermined with the terminal "A", and
when the frame rate of the dominant video in the measured frame rate storage is lower than the default frame rate, the encoding unit encodes the mixed video data so that the mixed video is transmitted at the frame rate of the dominant video to the terminal A, and when the frame rate of the dominant video in the measured frame rate storage is equal to or higher than the default frame rate, the encoding unit encodes the mixed video data so that the mixed video is transmitted at the default frame rate to the terminal A.

5. The apparatus according to claim 1, wherein
bit rates are used instead of the frame rates in the frame rate measuring unit, the measured frame rate storage, the encoding parameter selecting unit, and the encoding unit,
the apparatus further comprises an encoding parameter storage configured to store information on a default bit rate of the mixed video which is predetermined with the terminal "A", and
when the bit rate of the dominant video in the measured frame rate storage is lower than the default bit rate, the encoding unit encodes the mixed video data so that the mixed video is transmitted at the frame rate of the dominant video to the terminal A, and when the frame rate of the dominant video in the measured frame rate storage is equal to or higher than the default frame rate, the encoding unit encodes the mixed video data so that the mixed video is transmitted at the default bit rate to the terminal A.

6. The apparatus according to claim 1, wherein the encoding parameter selecting unit accepts, from the terminal A, selection of one of videos being transmitted by the first to Nth terminals, and determines the video selected by the terminal A as the dominant video.

7. A mixed video delivering method, comprising:
receiving first to Nth (N being an integer more than 1) encoded video data, from first to Nth terminals;
decoding the first to Nth encoded video data to obtain first to Nth decoded video data;
mixing the first to Nth decoded video data to obtain mixed video data representing a mixed video to be transmitted to a terminal "A" which is one of the first to Nth terminals;
receiving from the terminal "A" a layout change instruction requesting a change to layout information showing a layout of each video in the mixed video which is stored in a layout information storage;
updating the layout information in accordance with the layout change instruction wherein the mixing of the first to Nth decoded vide data is carried out based on the layout information;
measuring frame rates of the first to Nth videos;
writing the measured frame rates of the first to Nth videos into a measured frame rate storage;
identifying a dominant video which is dominant in the mixed video based on the layout information and selecting the frame rate of the dominant video in the measured frame rate storage;
encoding the mixed video data so that the mixed video is transmitted at the frame rate of the dominant video to the terminal A to obtain encoded mixed video data; and
transmitting the encoded mixed video data to the terminal A.

8. A non-transitory computer storage medium storing a computer program for causing a computer to execute instructions to perform the steps of:
receiving first to Nth (N being an integer more than 1) encoded video data, from first to Nth terminals;
decoding the first to Nth encoded video data to obtain first to Nth decoded video data;
mixing the first to Nth decoded video data to obtain mixed video data representing a mixed video to be transmitted to a terminal "A" which is one of the first to Nth terminals;
receiving from the terminal "A" a layout change instruction requesting a change to layout information showing a layout of each video in the mixed video which is stored in a layout information storage;
updating the layout information in accordance with the layout change instruction wherein the mixing of the first to Nth decoded vide data is carried out based on the layout information;

measuring frame rates of the first to Nth videos;
writing the measured frame rates of the first to Nth videos into a measured frame rate storage;
identifying a dominant video which is dominant in the mixed video based on the layout information and selecting the frame rate of the dominant video in the measured frame rate storage;

encoding the mixed video data so that the mixed video is transmitted at the frame rate of the dominant video to the terminal A to obtain encoded mixed video data; and
transmitting the encoded mixed video data to the terminal A.

* * * * *